United States Patent [19]

Nakamura

[11] Patent Number: 5,303,258
[45] Date of Patent: Apr. 12, 1994

[54] SPREAD SPECTRUM COMMUNICATIONS SYSTEM

[75] Inventor: Masaru Nakamura, Yokohama, Japan

[73] Assignee: Ricoh Company, Ltd., Tokyo, Japan

[21] Appl. No.: 964,943

[22] Filed: Oct. 22, 1992

[30] Foreign Application Priority Data

Oct. 24, 1991 [JP] Japan .................................. 3-306572
May 26, 1992 [JP] Japan .................................. 4-160218
Oct. 14, 1992 [JP] Japan .................................. 4-303068

[51] Int. Cl.$^5$ ............................................. H04L 27/30
[52] U.S. Cl. ............................................. 375/1; 380/34
[58] Field of Search .................... 375/1, 380/34; 370/18

[56] References Cited

U.S. PATENT DOCUMENTS 5,204,877 4/1993 Endo et al. ............................ 375/1

OTHER PUBLICATIONS

"A Study of Optical Transmission in Space Using Spread Spectrum Method," M. Nakazono, et al., IEICE of Japan, pp. 39–43, Aug. 1989 (In Japanese).
"A Method of Fast Data Transmission For a Spread Spectrum Modem Using a Saw Convolver," Y. Uchida, et al., IEICE of Japan, pp. 105–111, Jun. 1990 (In Japanese).

*Primary Examiner*—Bernarr E. Gregory
*Attorney, Agent, or Firm*—Oblon, Spivak, McClelland, Maier & Neustadt

[57] ABSTRACT

A spread spectrum communications system includes: a transmitter having an input information a modulator for generating a spread spectrum signal in accordance with an input information signal together with a pseudonoise clock signal used to generate a first pseudonoise signal formed of a plurality of chips, a switch for switching on and off a locally generated carrier signal of said input information signal in accordance with the spread spectrum signal, a first means for inverting a phase of the spread spectrum signal when the value of the pseudonoise signal is equal to one, a second means for multiplying the inverted-phase spread spectrum signal by the carrier signal so as to produce a transmit signal at an output of the second means, and an output means for outputting the transmit signal from the second means so that the transmit signal is transmitted from the transmitter; and a receiver which receives the transmit signal from the transmitter, the receiver having a detector for obtaining a baseband signal from the transmit signal received at the detector, and a demodulation part for demodulating the baseband signal with a second pseudonoise signal which is generated synchronously with the transmit signal, so as to reproduce the input information signal.

14 Claims, 12 Drawing Sheets

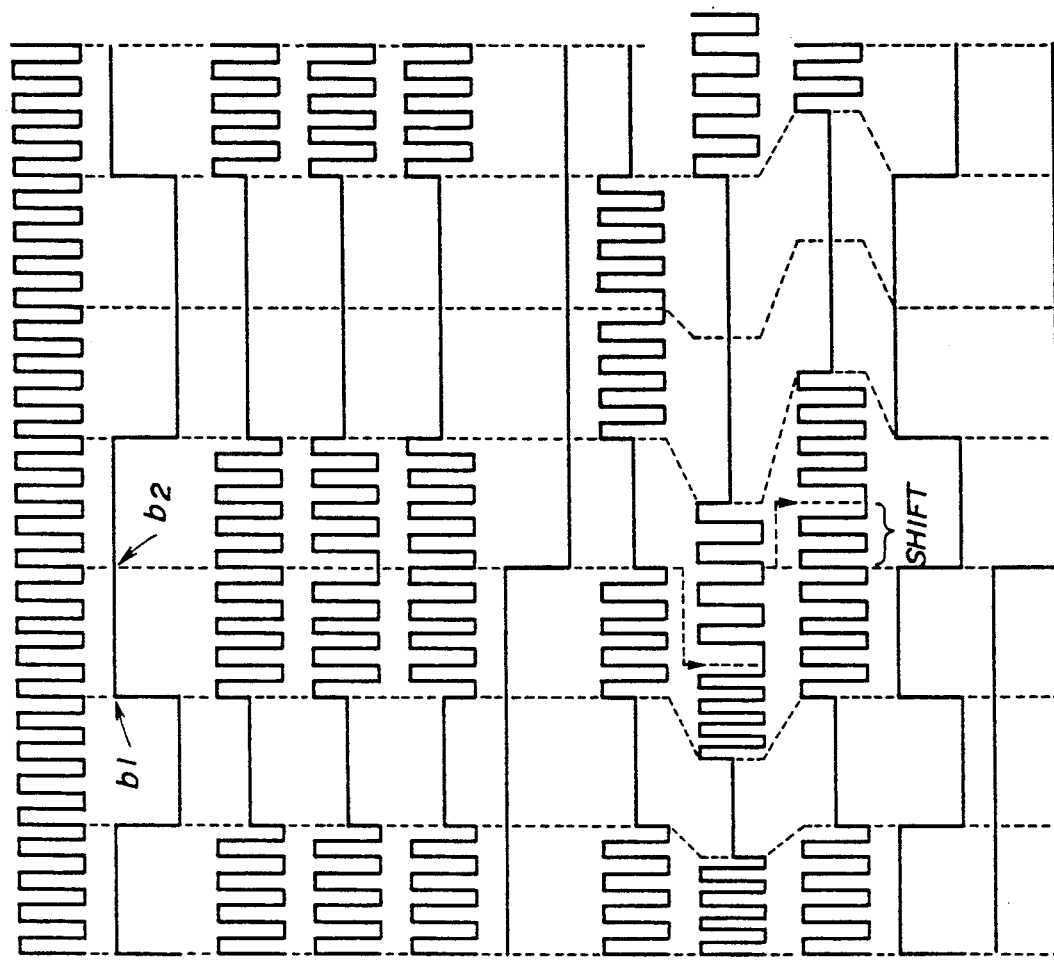

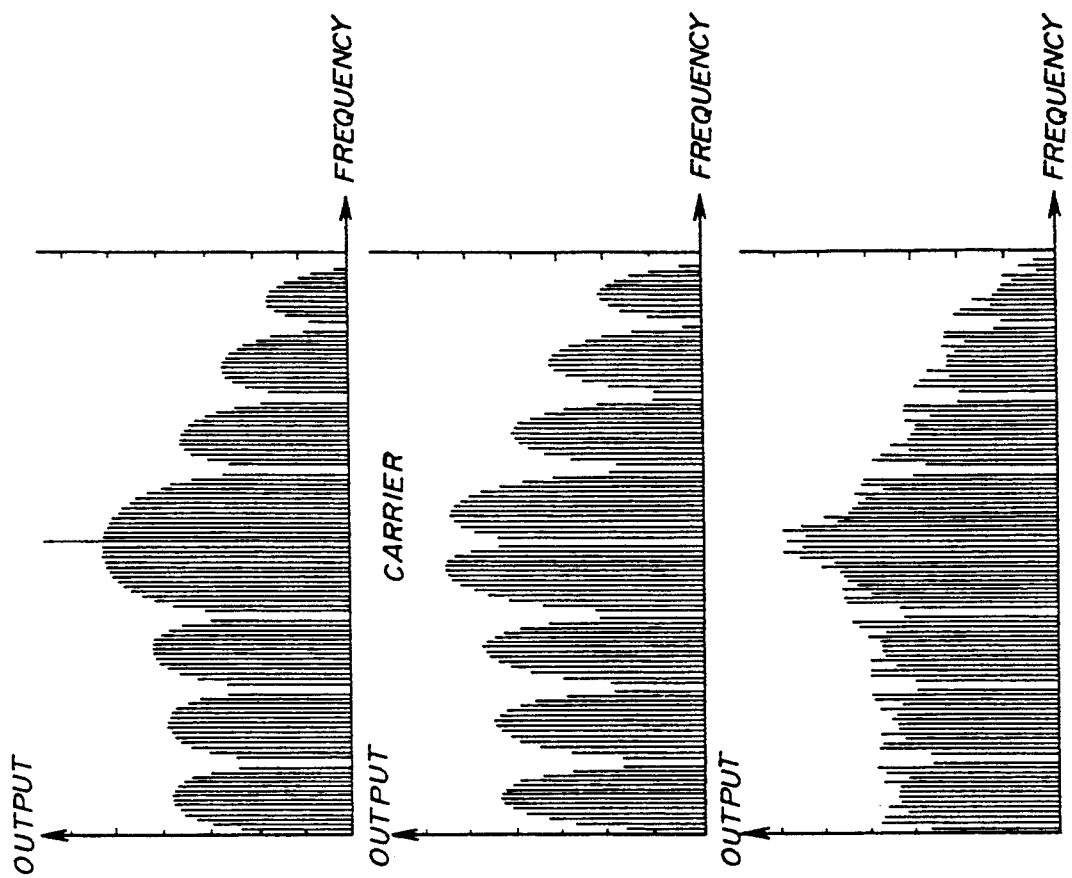

(a) STATIONARY (b) 0→1

(c) 1→0

SPREAD SPECTRUM COMMUNICATIONS SYSTEM

BACKGROUND OF THE INVENTION

The present invention generally relates to spread spectrum communications, and more particularly to a spread spectrum communications system which uses a spread spectrum signal multiplied with a pseudo noise code sequence for transmitting and receiving a message. This system is applicable to wireless communications such as radio transmission systems, and enables multiple access, increased immunity to noise, and increased resistance to interference.

Generally, a spread spectrum communications system makes use of a sequential noise-like signal structure, for example, pseudo noise codes (hereinafter called pn codes), to spread a normally narrowband information signal over a relatively wide band of frequencies. At the transmitter of the spread spectrum communications system, a spread spectrum (ss) signal in which a carrier multiplied with a pn sequence is modulated in accordance with the information signal is transmitted. The receiver of the system correlates the signals to retrieve the original information. The basic signal characteristics of the spread spectrum communications system include: the carrier of the ss signal is an unpredictable, wideband signal multiplied with a pn code sequence, the bandwidth of the carrier is much wider than the bandwidth of the data modulation; and demodulation is accomplished by correlation of the received wideband signal with a synchronously generated replica of the wideband signal The advantages of the ss communications system include the unpredictability of the wideband signal, the security of the transmitted data signal, and the multiple access capability.

In the prior art, there is a spread spectrum method for data transmission which uses optical transmission for spread spectrum communications. This method is disclosed in "A Study of Optical Transmission in Space Using Spread Spectrum Method" by M. Nakazono et al., a transaction of the Institute of Electronics, Information and Communication Engineers (IEICE) of Japan, pp.39–43, SSTA89-17, August, 1989. In the above mentioned spread spectrum communications method, a spread spectrum (ss) signal in which information is multiplied with pn codes is produced and the ss signal is transmitted by using light as the carrier. If this optical method is applied to a spread spectrum communications system using a radio wave as the carrier, the spread of frequencies of the ss signal is not enough to secure the information, and the spectrum of the ss signal contains the carrier frequency as a very large component of the spectrum.

There is another spread spectrum communications method in the prior art. This method is disclosed in "A Method of Fast Data Transmission For A Spread Spectrum Modem Using a SAW Convolver" by Y. Uchida et al., a transaction of the IEICE of Japan pp.105–111, SSTA90-32, June, 1990. In this spread spectrum communications method, a spread spectrum (ss) signal in which a carrier is switched on and off in accordance with a pn code sequence is modulated in accordance with an information signal, and the thus generated ss signal is transmitted. However, when the ss signal is received at any external receiver of a third party, the received ss signal can easily be demodulated to reproduce the original information with no need of using the pn code sequence because the spectrum thereof contains a very large carrier component. Thus, the security of the information is not available with the above conventional system.

SUMMARY OF THE INVENTION

Accordingly, it is a general object of the present invention to provide an improved spread spectrum communications system in which the above described problems are eliminated.

Another, more specific object of the present invention is to provide an improved technique for generating a spread spectrum signal in which the carrier is suppressed enough which signal is transmitted and received by a spread spectrum communications system. Still another object of the present invention is to provide a spread spectrum communications system in which the above signal generating technique is applied to spread spectrum modulation and demodulation of the spread spectrum communications system. A further object of the present invention is to provide a spread spectrum communications system which does not require the synchronization of the carrier signal with the clock signal.

The above mentioned objects of the present invention are achieved by a spread spectrum communications system which includes: a transmitter having an input information, a modulation part for generating an ss signal in accordance with the input information, together with a clock signal which is used to generate a first pn signal formed of a plurality of chips, a switch for switching on and off a carrier signal in accordance with the ss signal of the modulation part, a first part for inverting a phase of the ss signal of the modulation part when the first pn signal is continuously at a high value from chip to chip, a second part for combining the inverted-phase ss signal of the first part with the carrier signal of the switch to produce a transmit signal, and an output part for outputting the transmit signal so that the transmit signal is transmitted from the transmitter; and a receiver which receives the transmit signal from the transmitter, the receiver having a detector for obtaining a baseband signal from the transmit signal received at the detector, and a demodulation part for demodulating the baseband signal with a second pn signal which is generated synchronously with the transmit signal, so as to reproduce data corresponding to the input information.

The above mentioned objects of the present invention are also achieved by a spread spectrum communications system which includes: a transmitter having an input information, a modulation part for generating an ss signal in accordance with the input information, a switch for switching on and off a carrier signal in accordance with the ss signal, a first part for inverting a phase of the ss signal of the modulation part when a first pn signal formed of a plurality of chips changes from a low value at a preceding chip to a high value at a current chip, a second part for combining the inverted-phase ss signal with the carrier signal of the switch to produce a transmit signal, and an output part for outputting the transmit signal so that the transmit signal is transmitted from the transmitter; and a receiver which receives the transmit signal from the transmitter, the receiver having a detector for obtaining a baseband signal from the transmit signal received at the detector, and a demodulation part for demodulating the baseband signal with a second pn sequence signal which is generated synchronously with the transmit signal, so as to reproduce data corresponding to the input information.

According to the present invention, it is possible to efficiently spread the narrowband information signal over a wide band of frequencies with the carrier frequency being suppressed enough, thus allowing the security of the information. Also, the ss signal generating technique of the present invention can be suitably applied to several radio communications systems employing different spread spectrum modulations and demodulations.

Other objects and further features of the present invention will become apparent from the following detailed description when read in conjunction with the accompanying drawings.

BRIEF DESCRIPTION OF THE DRAWINGS

FIG. 3(a)-(k) are a chart for explaining operations performed by the spread spectrum communications system according to the present invention;

FIGS. 4A through 4C are diagrams showing a spectrum of frequencies of each of three kinds of transmit signals;

DESCRIPTION OF THE PREFERRED EMBODIMENTS

Figure 1A:
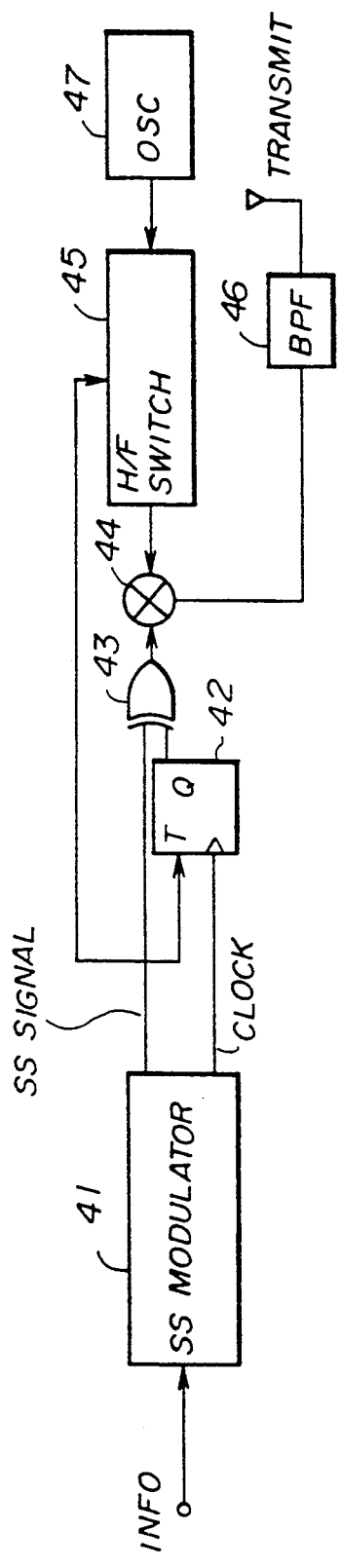
FIGS. 1A and 1B are block diagrams showing a first embodiment of a spread spectrum communications system according to the present invention.

First, a description will be given of basic operations performed by a spread spectrum communications system according to the present invention, with reference to FIG. 3(a) through (k) and FIGS. 4A through 4C.

FIG. 3(a) shows a carrier signal, and FIG. 3(b) shows a sequence of pn pseudonoise codes (each unit element of the pn code sequence is hereinafter referred to as a chip). In the signals shown, each chip of the pn code sequence of FIG. 3(b) corresponds to four periods of the carrier signal of FIG. 3(a), for the sake of simplicity. The carrier signal shown in FIG. 3(a) is a rectangular pulse train of a digital signal, for the sake of convenience. However, a carrier having a sinusoidal waveform can be used instead.

FIG. 3(c) shows a spread spectrum (ss) signal which is obtained by simply turning on and off the carrier signal of FIG. 3(a) in accordance with the pn sequence of FIG. 3(b). FIG. 4A shows a spectrum of frequencies obtained from the ss signal as shown in FIG. 3(c). It should be noted in FIG. 4A that a carrier signal component appears sharply at a central narrowband portion of the frequency spectrum shown. If the ss signal of FIG. 3(c) is used by a spread spectrum communications system, there is a problem in that such a carrier signal component can easily be removed from a received ss signal, and if the carrier signal component is removed, any receiver different from that of the spread spectrum communications system would easily accomplish a demodulation of the received ss signal so as to reproduce the original information. Thus, the advantages of the spread spectrum communications system including the information security is not available. In some case, the information being exchanged between a transmitter and a receiver in the spread spectrum communications system may leak to a third party.

In order to eliminate the above mentioned problem, the spread spectrum communications system of the present invention uses a transmit signal as shown in FIG. 3(d) or FIG. 3(e) in which the above mentioned narrowband carrier signal portion is removed. The transmit signal shown in FIG. 3(d) is produced by inverting the phase of the ss signal shown in FIG. 3(c) when the pn code sequence is continuously in ON state (the high value "1"), as indicated by arrows b1 and b2 shown in FIG. 3(b). FIG. 4B shows a spectrum of frequencies obtained from the transmit signal shown in FIG. 3(d). It is to be noted that the carrier signal in the transmit signal shown in FIG. 3(d) is suppressed as in the frequency spectrum shown in FIG. 4B, and that the transmit signal substantially has only the ss signal frequencies.

Also, FIG. 3(e) shows another improved transmit signal in which the carrier signal is suppressed, which is used by the spread spectrum communications system of the present invention. This transmit signal, shown in FIG. 3(e), is produced by inverting the phase of the ss signal shown in FIG. 3(c) when the pn code sequence changes from OFF state (the low value "0") at a preceding chip to ON state (the high value "1") at a current chip or vice versa, as indicated by an arrow b1 in FIG. 3(b). FIG. 4C shows a spectrum of frequencies obtained from the ss signal shown in FIG. 3(e). It is to be noted that a small carrier signal component appears in the spectrum shown in FIG. 4C, and that the spectrum obtained from the transmit signal of FIG. 4C has side lobes which are highly suppressed.

FIG. 3(f) shows a typical information signal input to the spread spectrum communications system. FIG. 3(g) through (i) show several transmit signals which are applied to several data modulation techniques used in the existing spread spectrum communications systems.

FIG. 3(g) shows a transmit signal used by a spread spectrum communications system to which direct sequence data modulation is applied. In a case of the transmit signal shown in FIG. 3(g), the phase of the carrier is turned on and off in the ss signal in accordance with the information signal shown in FIG. 3(f). FIG. 3(h) shows a transmit signal used by a spread spectrum communications system to which clock frequency shifting or keying is applied. In a case of the transmit signal shown in FIG. 3(h), the time of one chip of the pn code sequence in the ss signal varies in accordance with the information signal shown in FIG. 3(f), and the frequency of the carrier in the ss signal also varies in accordance with the information signal. FIG. 3(i) shows a transmit signal used by a spread spectrum communications system to which clock phase shifting or keying is applied. In a case of the transmit signal shown in FIG. 3(i), the phase of the carrier in the ss signal varies (by a certain amount of advance or delay in accordance with the information signal shown in FIG. 3(f).

A more detailed description will be given how the transmit signal received at the receiver is demodulated, by referring to FIG. 3(g), (j) and (k). In the case of the transmit signal shown in FIG. 3(g), the transmit signal received at an envelope detector of the receiver is shown in FIG. 3(j). In this signal shown in FIG. 3(j), a baseband ss signal multiplied with the pn code sequence is modulated in accordance with the information signal. By taking a logical product (exclusive-OR operation) between the received signal of FIG. 3(j) and a synchronously generated signal of the pn code sequence (FIG. 3(b)), which is the same as that generated by the pn generator of the transmitter, a demodulated signal indicating the original information can be reproduced as shown in FIG. 3(k). Similarly, in the cases of the signals shown in FIG. 3(h) and 3(i), a baseband signal of the ss signal is obtained, and then a demodulated signal indicating the original information is reproduced with a synchronously generated pn code sequence signal.

Each of the pn code signals respectively generated by a transmitter and a receiver of the spread spectrum communications system of the present invention is a pn signal produced by a maximal linear pseudonoise sequence (M sequence). The carrier signal is switched off in the ss signal when the pn signal is at the high value "1", and the carrier signal is switched on in the ss signal when the pn signal is at the low value "0". With this method of generating the pn code sequence signal, it is possible to prevent undesired ripple from taking place in the frequency spectrum of the ss signal. If the opposite method is used in which the carrier is switched on in the ss signal when the pn signal is at the high value "1" and the carrier is switched off in the ss signal when the pn signal is at the low value "0", the undesired ripple may take place in the frequency spectrum of the ss signal.

Figure 1B:
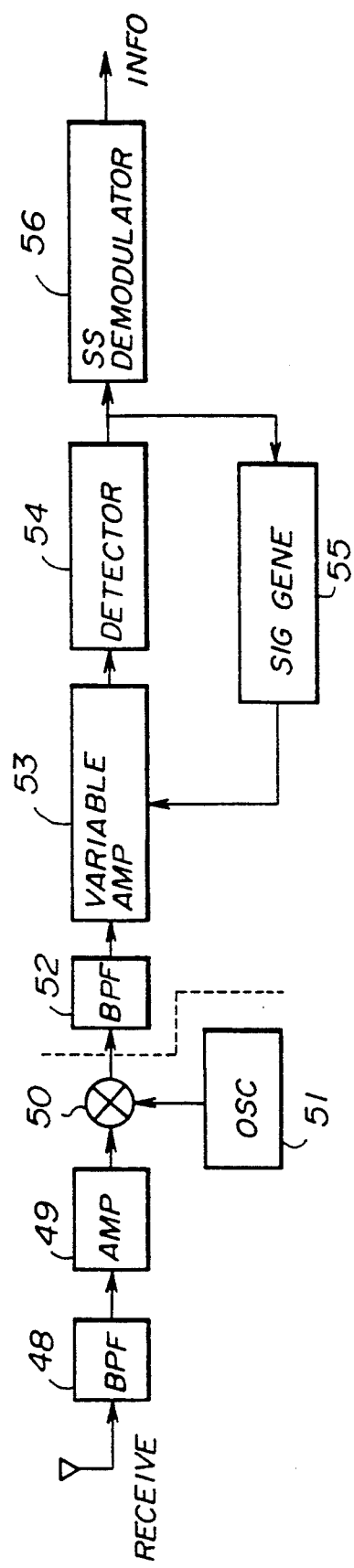

Next, a description will now be given of a first embodiment of the spread spectrum communications system according to the present invention, with reference to FIGS. 1A and 1B. FIG. 1A shows a transmitter of this spread spectrum communications system, this transmitter including an ss (spread spectrum) modulator 41, a T flip flop 42, an exclusive OR circuit 43, a multiplier 44, a high frequency switch 45, a BPF (band pass filter) 46, and a local oscillator (OSC) 47. FIG. 1B shows a receiver of the spread spectrum communications system, the receiver including a BPF (band pass filter) 48, an amplifier 49, a multiplier 50, a local oscillator (OSC) 51, a BPF 52, a variable amplifier 53 using an automatic gain control, a detector 54 having a diode, a gain control signal generator 55, and an ss (spread spectrum) demodulator 56.

In the transmitter of this embodiment, a transmit signal in which a carrier is suppressed as shown in FIG. 4B is generated, and the transmit signal multiplied with information is transmitted. The receiver of this embodiment is responsive to the transmit signal transmitted from the transmitter and can reproduce the original information from the received signal.

In the transmitter shown in FIG. 1A, an information signal is input to the ss modulator 41, and the ss modulator 41 outputs a modulated ss signal and a clock signal used to produce a pn code sequence at the ss modulator 41. The modulated ss signal of the ss modulator 41 is supplied to one input of the T flip flop 42, one input of the Ex-OR circuit 43, and the H/F switch 45. An output signal of the T flip flop 42 is supplied to another input of the Ex-OR circuit 43. The reference OSC 47 outputs a carrier signal to the H/F switch 45. At the H/F switch 45, the carrier signal is switched on and off in accordance with the on/off level of the modulated ss signal from the modulator 41. The T flip flop 42 is driven with the clock signal of the modulator 41, so that the carrier in the ss signal at the T flip flop 42 is toggled in accordance with the clock signal. The exclusive OR circuit 43 outputs a signal consisting of the logical product of the ss signal of the modulator 41 and the output signal of the T flip flop 42. Thus, in the ss signal output by the circuit 43, the phase of the ss signal from the ss modulator 41 is inverted when a chip of the pn code sequence is continuously in ON state. At the multiplier 44, the output signal of the Ex-OR circuit 43 is multiplied with the on/off keyed carrier signal from the switch 45. The output signal of the multiplier 44 is passed through the BPF 46 to extract the ss signal with necessary bandwidth therefrom. Then, the thus generated transmit signal output by the BPF 46 is transmitted. The H/F switch 45 of this embodiment may be a switch using a positive intrinsic negative (PIN) diode, for example The multiplier 44 of this embodiment may be a double-balanced mixer or dual-gate field-effect (FET) transistor. In a case in which a relatively low frequency signal is generated, these circuits may be replaced by digital circuits.

In the receiver shown in FIG. 1B, the transmit signal is received from the transmitter shown in FIG. 1A. When required, the received transmit signal is passed through the BPF 48, and amplified by the amplifier 49. Then, the received signal is supplied to the multiplier 50. The reference oscillator 51 outputs a carrier signal to the multiplier 50. At the multiplier 50, the received signal is subjected to frequency conversion. The multiplier 50 thus outputs an intermediate-frequency signal or baseband signal converted from the received transmit signal.

The output signal of the multiplier 50 is passed through the BPF 52, and the output signal of the BPF 52 is supplied to the variable amplifier 53 using an automatic gain control circuit. At the variable amplifier 53, an ss signal having a prescribed amplitude is generated from the output signal of the BPF 52. The output ss signal of the amplifier 53 is supplied to the detector 54 using a diode. At the detector 54, an envelop of the ss signal is obtained from the ss signal of the amplifier 53, so as to generate a baseband signal of the received ss signal. This baseband signal is input to the ss demodulator 56, and the ss demodulator 56 demodulates the baseband signal so as to reproduce the original information being transmitted. The output of the detector 54 is supplied to the controller 55 so that a control signal output by the controller 55 is fed back to the variable amplifier. The amplitude of the output signal of the variable amplifier 53 is controlled at a constant level with the control signal of the controller 53.

Figure 2A:
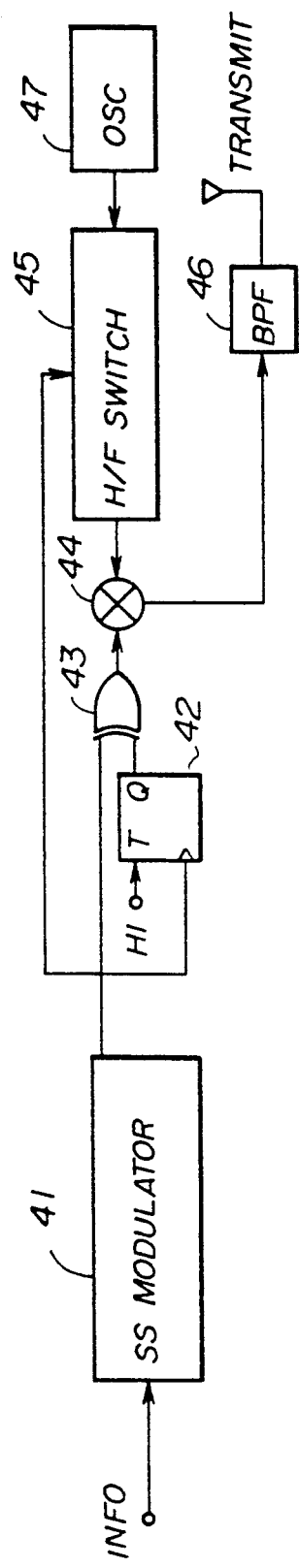
FIGS. 2A and 2B are block diagrams showing a variation of the spread spectrum communications system shown in FIGS. 1A and 1B.
Figure 2B:
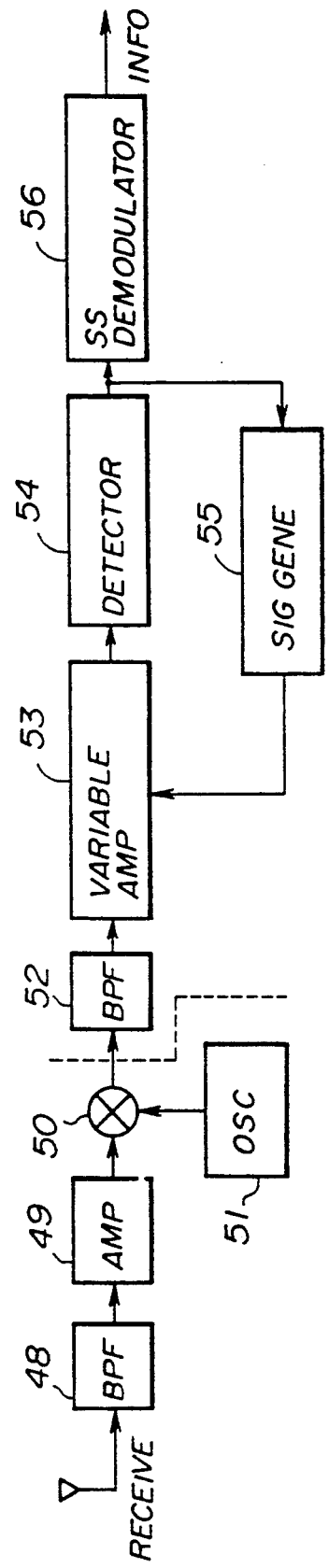

FIGS. 2A and 2B show a variation of the spread spectrum communications system shown in FIGS. 1A and 1B. FIG. 2A shows a transmitter of this modified spread spectrum communications system, and FIG. 2B shows a receiver responsive to a transmit signal transmitted by the transmitter shown in FIG. 2A. In FIGS. 2A and 2B, the parts which are the same as the corresponding parts of the system shown in FIGS. 1A and 1B are designated by the same reference numerals, and a description thereof will be omitted.

In this transmitter shown in FIG. 2A, a transmit signal in which a carrier is suppressed as shown in FIG. 4C is generated, and the transmit signal multiplied with information is transmitted. The receiver shown in FIG. 2B is responsive to the transmit signal transmitted by the transmitter and can reproduce the original information from the received signal. Since the receiver shown in FIG. 2B is the same as that shown in FIG. 1B, only a difference between the transmitter shown in FIG. 1A and the transmitter shown in FIG. 2A will now be described.

In the transmitter shown in FIG. 2A, an information signal is input to the ss modulator 41, and the ss modulator 41 outputs a modulated ss signal. No clock signal used to generate a pn code sequence in the ss modulator 41 is output. The modulated ss signal of the ss modulator 41 is supplied to a clock input of the T flip flop 42, one input of the Ex-OR circuit 43, and the H/F switch 45. A toggle (T) input to the T flip flop 42 is always set to a high state (HI), while the T flip flop 42 is driven with the modulated ss signal from the modulator 41. The output signal of the T flip flop 42 is supplied to another input of the Ex-OR circuit 43. The exclusive OR circuit 43 outputs a signal consisting of the logical product of the ss signal of the modulator 41 and the output signal of the T flip flop 42. Thus, in the output ss signal of the exclusive OR circuit 43, the phase of the ss signal from the ss modulator 41 is inverted when a chip of the pn code sequence varies from OFF state to ON state. The reference OSC 47 outputs a carrier signal to the H/F switch 45. At the H/F switch 45, the carrier signal is switched on and off in accordance with the on/off level of the modulated ss signal from the modulator 41. At the multiplier 44, the output signal of the Ex-OR circuit 43 is multiplied with the on/off keyed carrier signal of the switch 45. The output signal of the multiplier 44 is passed through the BPF 46 to extract the ss signal with necessary bandwidth therefrom. Then, the transmit signal output by the BPF 46, is transmitted.

Figure 5A:
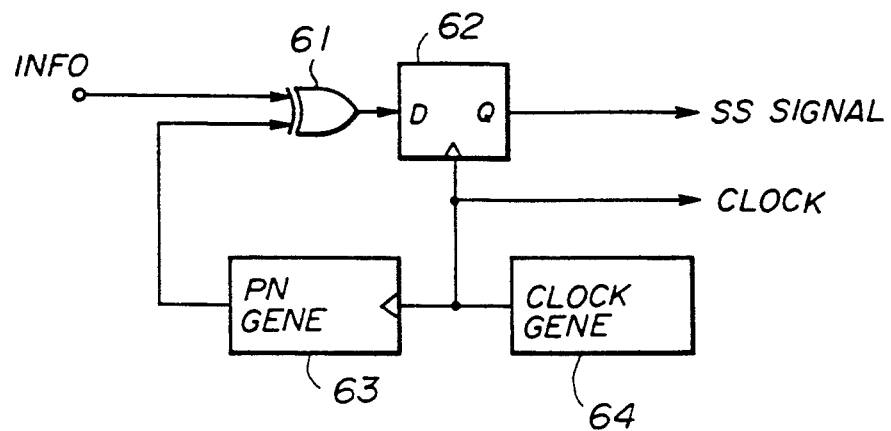
FIGS. 5A and 5B are block diagrams showing a modulation and demodulation used in the spread spectrum communications system according to the present invention.

Next, a description will now be given, with reference to FIGS. 5A and 5B, of a spread spectrum modulation and demodulation used in the spread spectrum communications system of the present invention. In a case of the spread spectrum modulation and demodulation shown in FIGS. 5A and 5B, a widely used direct sequence spread spectrum (ds/ss) is applied to the spread spectrum communications system of the present invention, and the transmit signal as shown in FIG. 3(g) is used in the spread spectrum communications system in order to transmit or receive an information signal shown in FIG. 3(f). FIG. 5A shows a ds/ss modulator according to the present invention, and FIG. 5B shows a ds/ss demodulator according to the present invention.

In the modulator shown in FIG. 5A, an exclusive OR circuit 61, a D latch circuit 62, a pn generator 63, and a clock generator 64 are connected to build the modulator circuit as shown in FIG. 5A. The clock generator 64 generates a reference clock signal, and this reference signal is supplied to the pn generator 63 and the D latch circuit 62, so that the pn generator 63 and the D latch circuit 62 are driven with the clock signal. A sequence of pn codes (pseudo noise codes) is generated by the pn generator 63 in accordance with the clock signal of the clock generator 64. The clock signal of the clock generator 64 used to generate the pn code sequence in the pn generator 63 is also output as an output signal of the ss modulator. At the exclusive OR circuit 61, an information signal being input to the transmitter, is multiplied (exclusive OR operation) with the pn sequence output by the pn generator 63. At the D latch circuit 62, the output signal of the exclusive OR circuit 61 is thus in accordance with known binary phase shift keying (BPSK), so as to output the ss signal being transmitted.

Figure 5B:
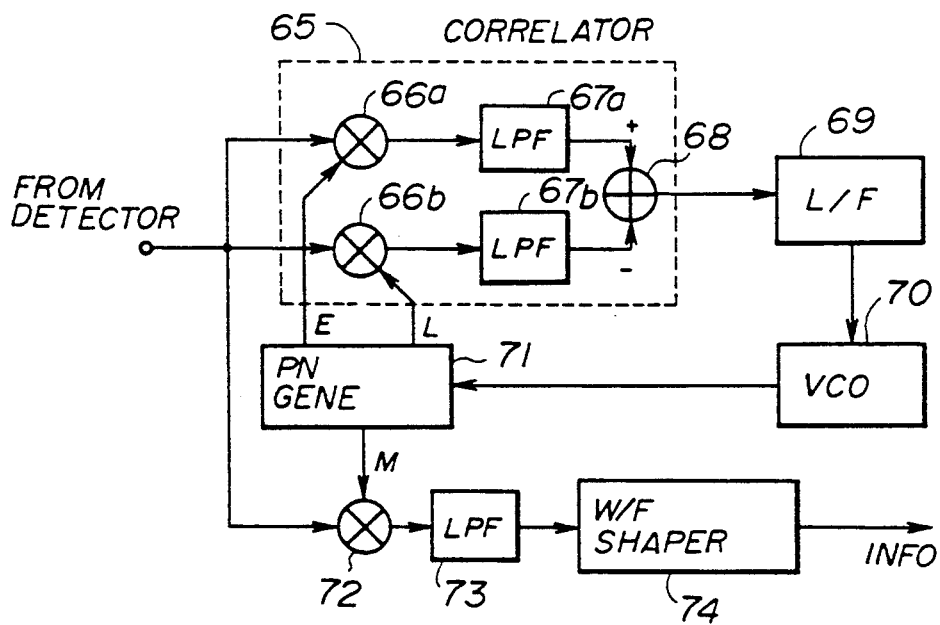

In the demodulator shown in FIG. 5B, the ss signal of the above described modulator is received and detected by a detector (not shown) An output signal of the detector is input to a correlator 65 of the demodulator. The correlator 65 has two multipliers 66a and 66b, two low-pass filters 67a and 67b, and a subtracter 68, so that the correlator 65 correlates the output signal of the detector and a pn sequence signal of a pn generator 71 so as to produce a sync signal. This sync signal is used to synchronize the pn sequence signal of the pn generator 71 with the received ss signal at the output of the detector. The sync signal output by the correlator 65 is passed through a loop filter (L/F) 69. A voltage-controlled oscillator (VCO) 70 is controlled in accordance with the sync signal output by the L/F 69 so that a reference signal is output to the pn generator 71 synchronously with the received ss signal. Thus, at the multiplier 72, the received ss signal from the detector is multiplied with the synchronously generated pn sequence signal (M) of the pn generator 71. The thus demodulated ss signal is passed through a low-pass filter 73 and a waveform shaper 74, so that corresponding data can be reproduced from the demodulated ss signal.

At the correlator 65 shown in FIG. 5B, two pn sequence signals (E, L) having different phases supplied from the pn generator 71 are multiplied by the output signal of the detector at the multipliers 66a and 66b, and passed through the two LPF 67a and 67b. At the subtracter 68 of the corellator, the correlation is accomplished with the output signals of the LPF 67a and 67b. A differential signal of these signals is used as the sync signal output by the correlator 65. In the embodiment shown in FIGS. 5A and 5B, a differentially encoded BPSK modulator and demodulator is described. However, a Manchester coded phase shift keyed modulator and demodulator may be used instead.

Figure 6A:
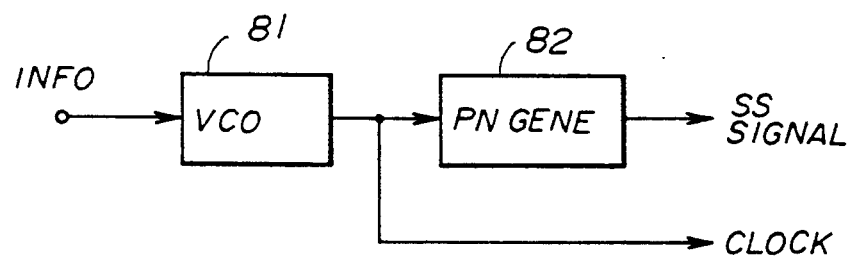
FIGS. 6A and 6B are block diagrams showing a variation of the spread spectrum modulation and demodulation shown in FIGS. 5A and 5B.
Figure 6B:
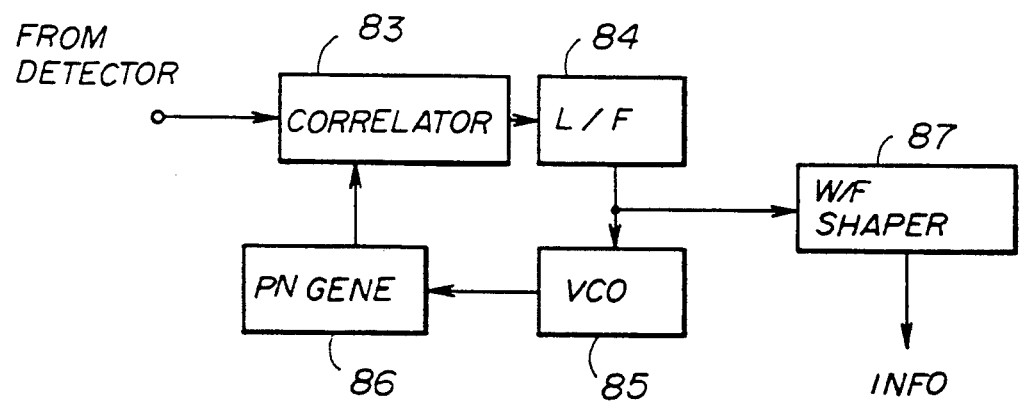

FIGS. 6A and 6B show a variation of the spread spectrum modulation and demodulation shown in FIGS. 5A and 5B. In the spread spectrum modulation and demodulation shown in FIGS. 5A and 5B, the clock frequency modulation is applied to the spread spectrum communications system of the present invention. The clock frequency modulation is performed with respect to a clock signal used to generate a pn code sequence in the pn generator. In the ss modulator shown in FIG. 6A, a voltage controlled oscillator (VCO) 81 and a pn generator 82 are provided. An information signal is input to the VCO 81, and the VCO 81 outputs a clock signal whose frequency is modulated in accordance with the information signal. At the pn generator 82, an ss signal to be transmitted is output in accordance with the frequency-modulated clock signal of the VCO 81.

In the ss demodulator shown in FIG. 6B, a correlator 83, a loop filter (L/F) 84, a voltage controlled oscillator (VCO) 85, a pn generator 86, and a waveform shaper 87 are provided In the same manner as that of the correlator 65 shown in FIG. 5B, the correlator 83 correlates the output signal of the detector (not shown in FIG. 6B) and the pn sequence signal of the pn generator 86. The result of the correlation obtained at the correlator 83 is passed through the loop filter 84, so as to produce a sync signal which is used to generate a pn code sequence in the pn generator 86 in a synchronized manner with the received ss signal at the output of the detector. The voltage-controlled oscillator (VCO) 85 is controlled in accordance with the sync signal at the output of the L/F 84 so that a pn clock signal is output to the pn generator 86 so as to generate the pn code sequence in a synchronized manner. The output signal of the L/F 84 is supplied to the waveform shaper 87 so that the received ss signal is demodulated so as to reproduce the data corresponding to the input information.

Figure 7A:
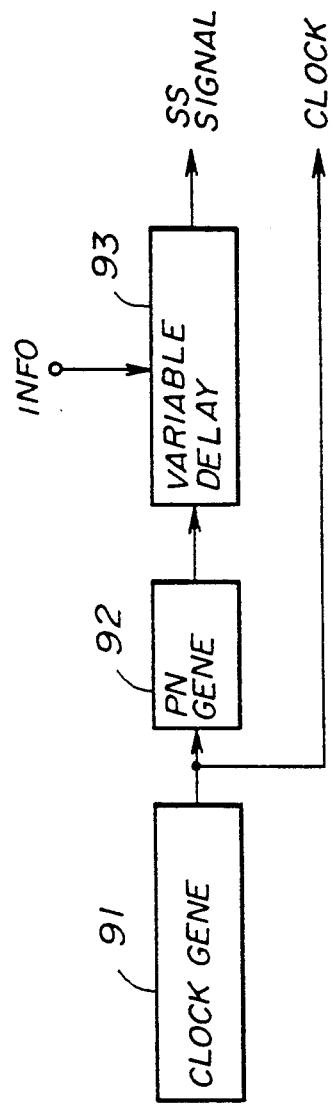
FIGS. 7A and 7B are block diagrams showing another variation of the spread spectrum modulation and demodulation shown in FIGS. 5A and 5B.
Figure 7B:
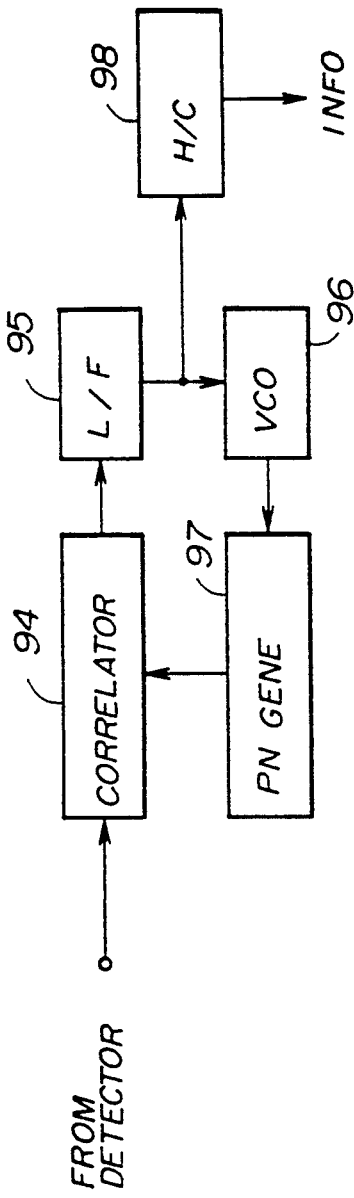

FIGS. 7A and 7B show another variation of the spread spectrum modulation and demodulation shown in FIGS. 5A and 5B. In this spread spectrum modulation and demodulation, shown in FIGS. 7A and 7B, the pn sequence signal phase modulation is applied to the spread spectrum communications system of the present invention. In the ss modulator shown in FIG. 7A, a clock generator 91, a pn generator 92, and a variable delay circuit 93 are provided. An information signal is input to the variable delay circuit 93. The clock generator 91 generates a clock signal, and this clock signal is supplied to the pn generator 92. At the pn generator 92, a pn code sequence is generated with the clock signal. The clock signal of the clock generator 91 is also output as an output signal of the ss modulator. The output signal of the pn generator 92 is supplied to the variable delay circuit 93. At the circuit 93, a delay time of an ss signal is varied or modulated in accordance with the information signal. Thus, the variable delay circuit 93 outputs a modulated ss signal multiplied with the information signal as the output signal of the ss modulator.

In the ss demodulator shown in FIG. 7B, a correlator 94, a loop filter (L/F) 95, a voltage-controlled oscillator 96, a pn generator 97, and a hysteresis comparator (H/C) 98 are provided. In the same manner as that of the correlator 6 shown in FIG. 5B, the correlator 94 correlates the output signal of the detector (not shown) and the pn sequence signal of the pn generator 97. The result of the correlation obtained at the correlator 94 is passed through the loop filter 95, so as to produce a sync signal which is used by the pn generator 97 to generate a pn code sequence synchronously with the received ss signal at the output of the detector. Thr voltage-controlled oscillator (VCO) 96 is controlled in accordance with the sync signal output by the L/F 95 so that a reference signal is provided at the pn generator 97 so as to generate the pn code sequence in a synchronized manner. The output signal of the loop filter 95 is supplied to the comparator 98 having a hysteresis so that a demodulated ss signal is produced so as to reproduce the data corresponding to the input information.

Figure 8A:
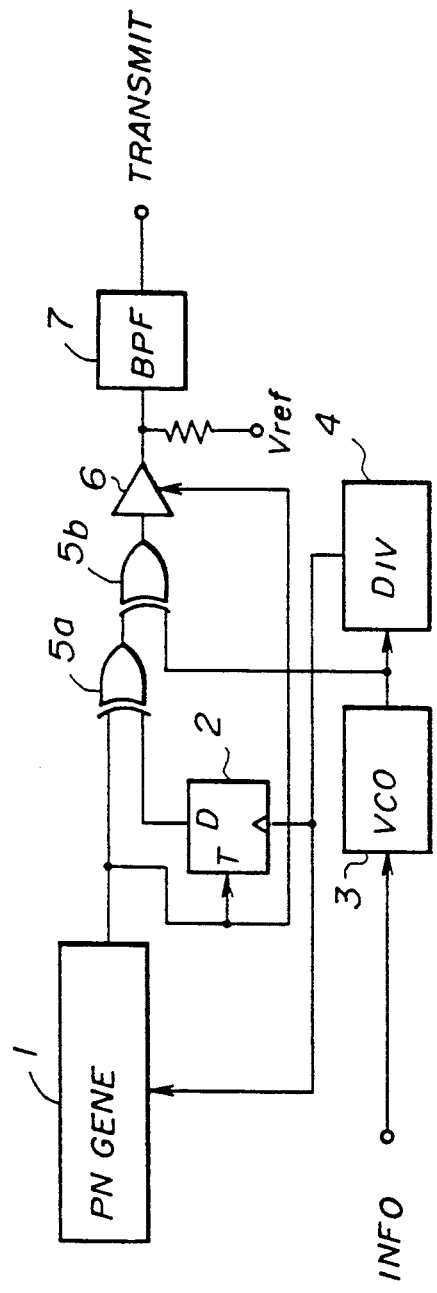
FIGS. 8A and 8B are block diagrams showing a second embodiment of the spread spectrum communications system according to the present invention.
Figure 8B:
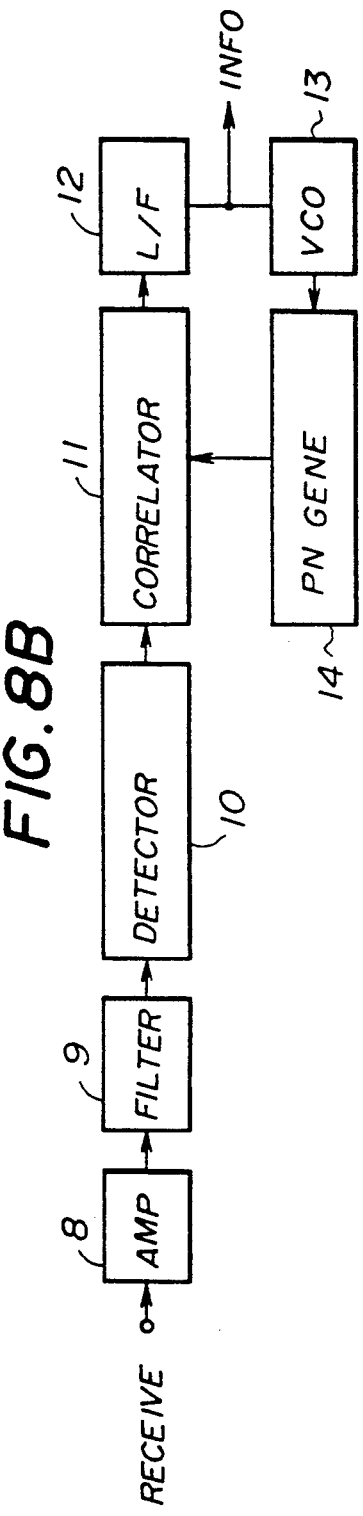

Next, a description will now be given of a second embodiment of the spread spectrum communications system according to the present invention, with reference to FIGS. 8A and 8B. FIG. 8A shows a transmitter of the spread spectrum communications system using the transmit signal shown in FIG. 4B. In this embodiment a reference signal produced by a reference oscillator is divided by a divider so as to produce a pn code clock of a pn generator. At the pn generator, a pn code sequence is generated in accordance with the output signal of the divider 4. The pn code sequence generated by the pn generator is synchronized with the reference signal of the reference oscillator. FIG. 8B shows a receiver which receives the transmit signal from the transmitter shown in FIG. 8A.

The transmit signal is produced at the transmitter of FIG. 8A by inverting the phase of the ss signal shown in FIG. 3(c) when the pn code sequence is continuously in ON state (at the high value "1"). The transmitter of this embodiment, shown in FIG. 8A, includes a pn generator 1, a T flip flop 2, a voltage-controlled oscillator (VCO) 3, a divider (DIV) 4, two exclusive-OR gates 5a and 5b, a three-state buffer circuit 6, and a band pass filter (BPF) 7.

In the above described transmitter, the VCO 3 generates a pn code clock whose frequency is modulated in accordance with the input information supplied to the transmitter. The output signal of the VCO 3 is supplied to the exclusive OR gate 5b and to the divider 4. The output signal of the VCO 3 is divided by the divider 4 into a divide clock signal which is used by the pn generator 1 and the flip flop circuit 2. The pn generator 1 generates a pn code sequence in accordance with the output signal of the divider 4. The pn code sequence signal of the pn generator 1 is supplied to one input of the flip flop 2 and to one input of the exclusive-OR gate 5a. At the exclusive-OR gates 5a and 5b and the buffer circuit 6, the phase of the ss signal at the circuit 5a is inverted when the pn signal of the pn generator 1 is continuously in ON state (at the high value "1"), the inverted-phase ss signal is multiplied with the carrier of the VCO 3 so as to produce a transmit signal shown in FIG. 3(d). The output signal of the buffer 6 is passed through the BPF 7 for outputting a desired band transmit signal.

The receiver shown in FIG. 8B includes an amplifier 8, a filter 9, a detector 10, a correlator 11, a loop filter (L/F) 12, a voltage-controlled oscillator (VCO) 13, and a pn generator 14. At the receiver shown in FIG. 8B, a received ss signal is amplified by the amplifier 8. A desired band of frequencies is obtained from the output signal of the amplifier 8 by using the filter 9 as required. The diode detector 10 detects an envelope of the received ss signal so as to obtain a baseband signal of the ss signal at the output of the detector 10. The correlator 11 correlates a second pn code sequence of the pn generator 14 and the baseband signal of the detector 10. The result of the correlation at the correlator 11 is supplied to the VCO 13 via the loop filter 12 as the control signal of the VCO 13. The pn code clock at the output of the VCO 13 is supplied to the pn generator 14 so that a second pn code sequence is generated in a synchronized manner. The baseband signal is obtained at the output of the loop filter 12 so as to reproduce data corresponding to the input information.

Figure 9:
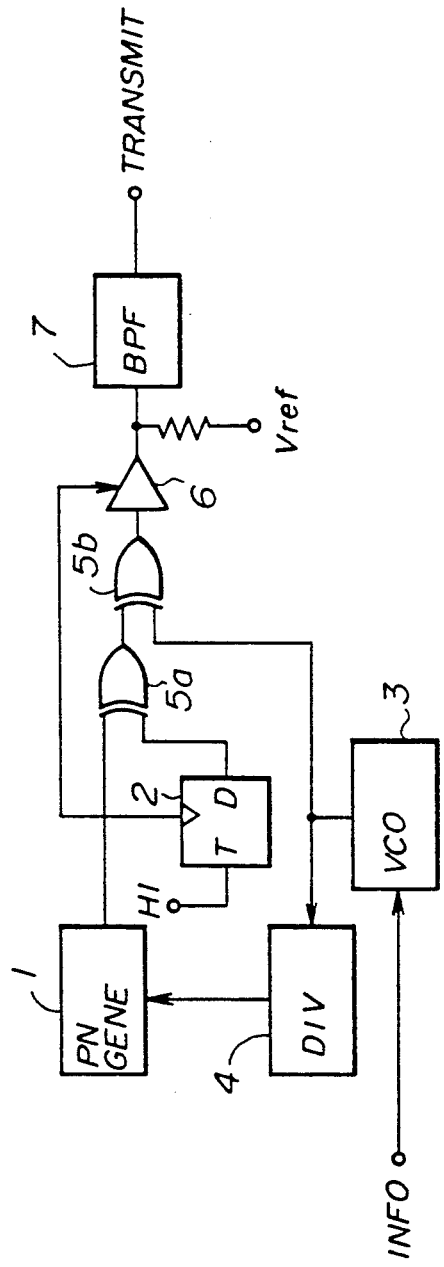
FIG. 9 is a block diagram showing a variation of a transmitter of the spread spectrum communications system shown in FIG. 8A.

FIG. 9 shows a variation of the transmitter shown in FIG. 8A. This transmitter, shown in FIG. 9, uses a transmit signal as shown in FIG. 3(e). The transmit signal is produced at the transmitter of FIG. 9 is produced by inverting the phase of the ss signal shown in FIG. 3(c) when the pn code sequence changes from OFF state (the low value "0") to ON state (the high value "1").

Figure 10A:
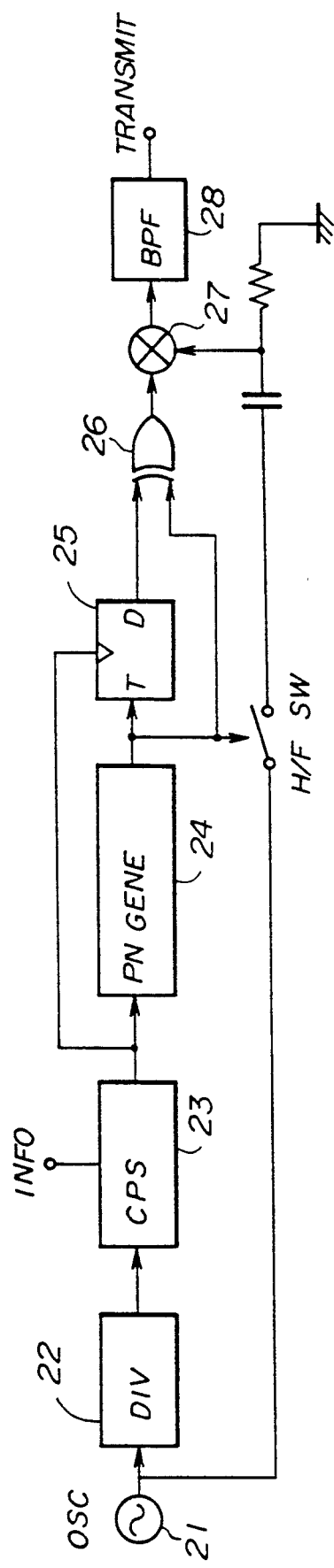
FIGS. 10A and 10B are block diagrams showing a variation of the spread spectrum communications system shown in FIGS. 8A and 8B.
Figure 10B:
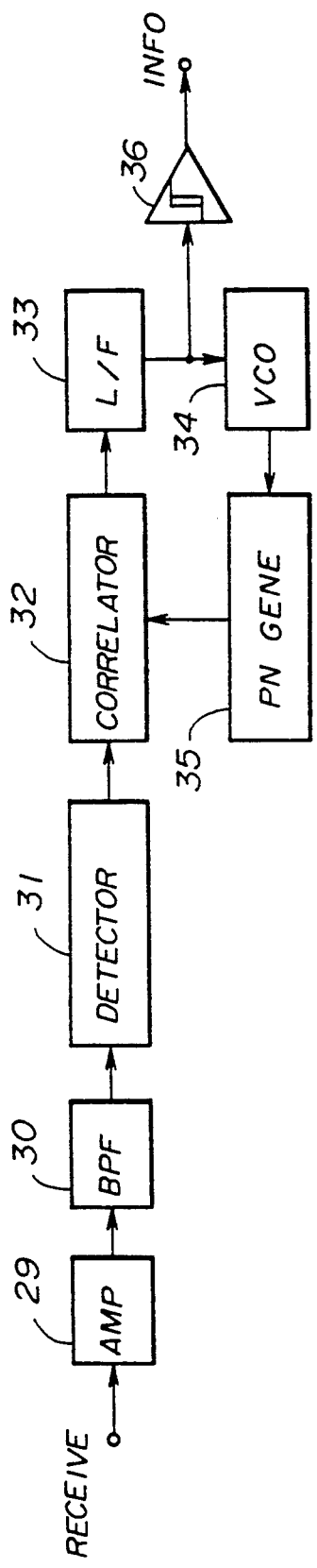

FIGS. 10A and 10B show a variation of the spread spectrum communications system shown in FIGS. 8A and 8B, wherein the clock phase keying is applied to the spread spectrum communications system according to the present invention. In this system, the transmit signal shown in FIG. 3(d) is used. The transmitter shown in FIG. 10A includes a reference oscillator (OSC) 21, a divider (DIV) 22, a clock phase shifter (CPS) 23, a pn code generator 24, a T flip flop 25, an exclusive OD circuit 26, a multiplier 27, and a band pass filter (BPF) 28. The receiver shown in FIG. 10B includes an amplifier 29, a band pass filter (BPF) 30, a detector 31, a correlator 32, a loop filter (L/F) 33, a voltage-controlled oscillator (VCO) 34, a pn code generator 35, and a hysteresis comparator (H/C) 36.

Each of the pn code signals respectively generated by the transmitter and receiver of the system shown in FIGS. 10A and 10B is a pn signal of a maximal linear pseudo noise sequence (M sequence). The carrier of the ss signal is switched off when the pn code signal is at the high value "1", and the carrier of the ss signal is switched on when the pn code signal is at the low value "0". By using this pn code signal generating method being used, it is possible to prevent undesired ripple from occurring in the frequency spectrum of the ss signal. In this system, the output signal of the reference oscillator is used as the pn code clock to generate the pn code sequence.

Figure 11:
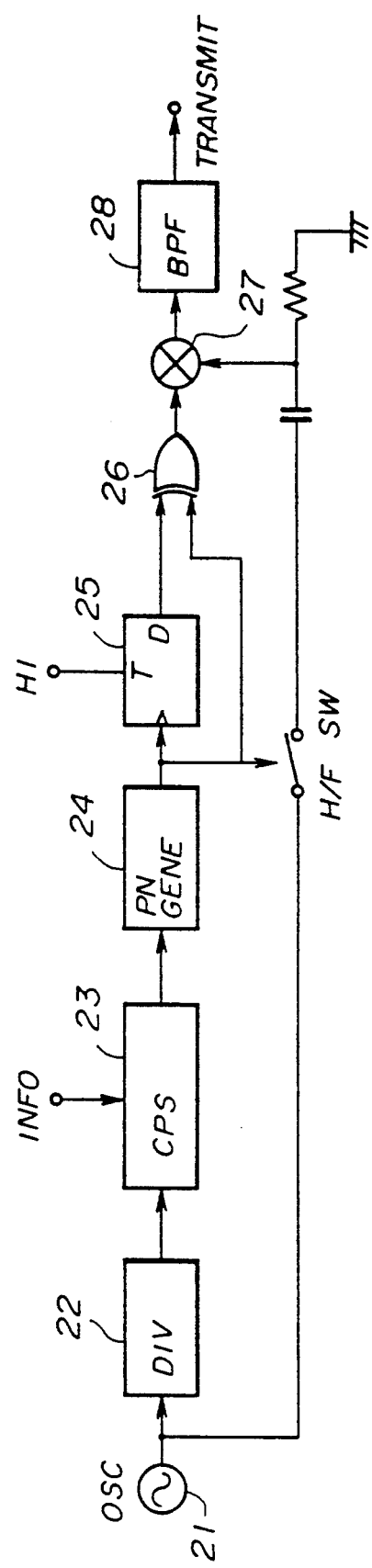
FIG. 11 is a block diagram showing another variation of the transmitter of the spread spectrum communications system shown in FIG. 8A.

FIG. 11 shows another variation of the transmitter shown in FIG. 8A. In FIG. 11, the parts which are the same as the corresponding parts shown in FIG. 10A are designated by the same reference numerals, and a description thereof will be omitted. In the transmitter shown in FIG. 11, the clock signal generated by the reference oscillator 21 is phase-shifted by the clock phase shifter 23 in accordance with the input information. A high (HI) level signal is always set to a toggle (T) input of the flip flop 25, and a pn code sequence signal generated by the pn generator 24 with a phase-shifted control signal of the clock phase shifter 23 is supplied to the clock input of the flip flop 25. By taking the logical product (exclusive-OR operation) between the output signal of the pn generator 24 and the output signal of the flip flop 25 at the circuit 26, and by multiplying the output signal of the circuit 26 with the output signal of the oscillator 21, the transmit signal shown in FIG. 3(e) is generated.

Figure 12:
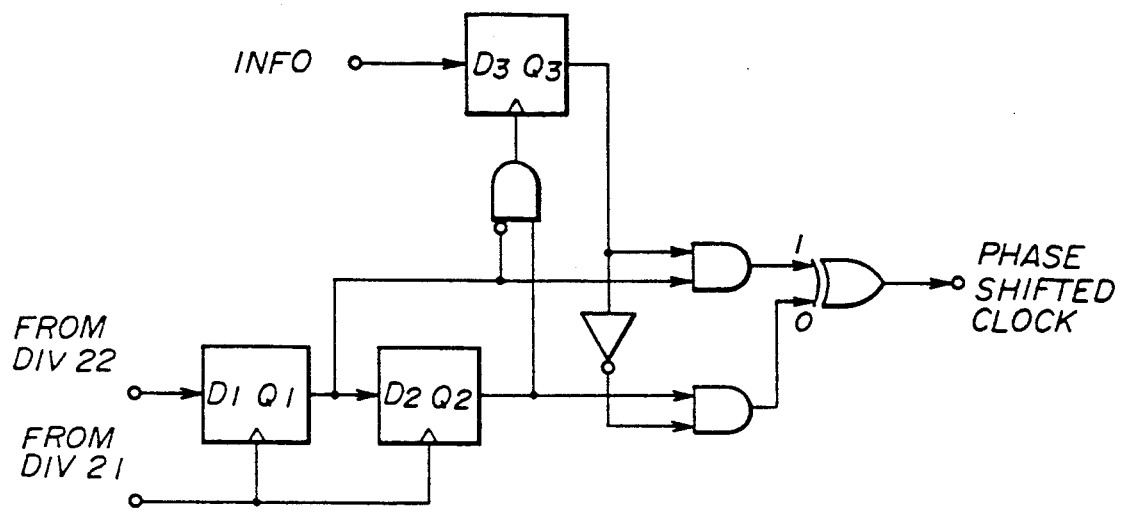
FIG. 12 is a block diagram showing a clock phase modulator which is applied to the transmitter of the spread spectrum communications system shown in FIG. 11.

FIG. 12 shows a typical clock phase shifter used in the transmitter of the spread spectrum communications system shown in FIG. 11. This clock phase shifter generates a phase shifted clock signal which is modulated in accordance with the input information. The output signal of the divider 22 is supplied to one input of a shift register having two flip-flops, and the reference signal of the oscillator 21 is supplied to the other input of the shift register. One of the two outputs of the flip-flops is selected in accordance with the input information.

Figure 13:
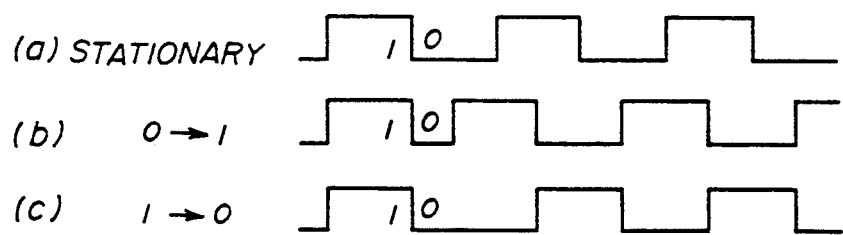
FIG. 13 is a diagram for explaining operations performed by the clock phase modulator shown in FIG. 12.

FIG. 13 shows changes of the phase of the output signal of the clock phase shifter shown in FIG. 12. When the information signal is stationary with no change, either of the outputs Q1 and Q2 of the flip-flops of the clock phase shifter is selected A pn code clock is generated at a constant rate by the clock phase shifter, as shown in FIG. 13(a). In this clock phase shifter, a trigger signal is supplied to a third flip flop having an output Q3 when the outputs Q1 and Q2 of the two flip-flops are (1, 0). If the information signal changes from the low value "0" to the high value "1", the output Q1 is output by the CPS 23 as the pn code clock input to the the pn code generator 24. As shown in FIG. 13(b), the phase of the pn code clock (Q1) produced at the clock phase shifter has an advance of $\frac{1}{4}$ clock time relative to a start of one period of the non-phase-modulated clock. If the information signal changes from the high level "1" to the low value "0", the output Q2 is output by the CPS 23 as the pn code clock input to the pn code generator 24. As shown in FIG. 13(c), the phase of the pn code clock produced at the clock phase shifter has a delay of $\frac{1}{4}$ clock time relative to a start of one phase of the non-phase-modulated clock.

As described above, it is possible to efficiently spread the narrowband data signal over a wide band of frequencies with the carrier frequency being suppressed enough, thus allowing the seciruty of the transmitted data. Also, the present invention can be suitably applied to several kinds of spread spectrum modulations and demodulations.

Further, the present invention is not limited to the above described embodiments, and variations and modifications may be made without departing from the scope of the present invention.

What is claimed is:

1. A spread spectrum communications system comprising:

a transmitter having an input information modulation means for generating a spread spectrum signal in accordance with an input information signal and for generating a pseudonoise clock signal which is used to generate a first pseudonoise signal formed of a plurality of chips, the value of said first pseudonoise signal being either 0 or 1 at each chip, a switch for switching on and off a locally generated carrier signal of said input information signal in accordance with the value of the present chip of said first pseudonoise signal, first means for inverting a phase of said spread spectrum signal outputted from said modulation means when the present value of said first pseudonoise signal is equal to 1, second means for multiplying the inverted-phase spread spectrum signal outputted from said first means by said locally generated carrier signal outputted from said switch so as to produce a transmit signal at an output of said second means, an output means for transmitting said transmit signal from said transmitter, and a receiver which receives said transmit signal from said transmitter, said receiver having a detector for obtaining a baseband signal from said transmit signal received at said detector, and demodulation means for demodulating said baseband signal with a second pseudonoise signal generated synchronously with said transmit signals to reproduce said input information signal.

2. A spread spectrum communications system according to claim 1, wherein said input information modulation means comprises: a pseudonoise clock signal generator for generating a pseudonoise clock signal; a first pseudonoise signal generator for generating a first pseudonoise signal formed of a plurality of chips, and means for forming said spread spectrum signal in accordance with said pseudonoise clock signal by receiving an input signal consisting of a logical product of said input information signal and said first pseudonoise signal and multiplying said input signal by a locally generated carrier signal of said input information signal, and wherein said demodulation means comprises: a second pseudonoise signal generator for generating a second pseudonoise signal formed of a plurality of chips; a correlator for correlating said second pseudonoise signal with said transmit signal received at said detector and for outputting a result of the correlation; synchronizing means for synchronizing said second pseudonoise signal with said transmit signal in accordance with said result of said correlation to produce a synchronized second pseudonoise signal; and means for outputting a demodulated spread spectrum signal by multiplying said synchronized second pseudonoise signal by said transmit signal received at said detector to provide a multiplied signal, and by shaping a waveform of said multiplied signal through a waveform shaper so as to reproduce said input information signal.

3. A spread spectrum communications system according to claim 1, wherein said input information modulation means comprise: an oscillator for generating a clock signal whose frequency is modulated in accordance with said input information signal; and a first pseudonoise signal generator for generating a first pseudonoise signal formed of a plurality of chips in accordance with said clock signal, and wherein said demodulation means comprises: a second pseudonoise signal generator for generating a second pseudonoise signal formed of a plurality of chips, a correlator for correlating said second pseudonoise signal with said transmit signal received at said detector to produce a result of correlation; synchronizing means for synchronizing said second pseudonoise signal with said transmit signal in accordance with said result of said correlation to produce a synchronized second pseudonoise signal; and means for outputting a demodulated signal by correlating said synchronized second pseudonoise signal with said transmit signal received at said detector to produce a correlated signal, and by shaping a waveform of said correlated signal through a waveform shaper so as to reproduce said input information signal.

4. A spread spectrum communications system according to claim 1, wherein said input information modulation means comprises: a pseudonoise clock signal generator for generating a pseudonoise clock signal, a first pseudonoise signal generator for generating a first pseudonoise signal formed of a plurality of chips in accordance with said pseudonoise clock signal; and a delay circuit for delaying said first pseudonoise signal generated by said first pseudonoise signal generator in accordance with said input information signal, and wherein said demodulation means comprises: a second pseudonoise signal generator for generating a second pseudonoise signal formed of a plurality of chips, a correlator for correlating said second pseudonoise signal with said transmit signal received at said detector to produce a result of correlation; synchronizing means for synchronizing said second pseudonoise signal with said transmit signal in accordance with the result of said correlation to produce a synchronized second pseudonoise signal; and means for outputting a demodulated signal by correlating said synchronized second pseudonoise signal with said transmit signal received at said detector to produce a correlated signal, and by passing said correlated signal through a comparator with a hysteresis characteristic so as to reproduce said input information signal.

5. A spread spectrum communications system according to claim 1, wherein said receiver further comprises a band pass filter, an amplifier, a reference oscillator, a multiplier, and a variable amplifier for processing the transmit signal received from said transmitter so as to produce a modulated spread spectrum signal with a prescribed amplitude before said transmit signal is received at said detector.

6. A spread spectrum communications system according to claim 1, wherein said transmitter includes a reference oscillator for outputting a carrier signal of the input information signal, a divider for dividing a frequency of said carrier signal and for outputting a control signal having the divided frequency, and a pseudonoise signal generator for generating a pseudonoise signal in accordance with said control signal so as to synchronize said pseudonoise clock signal from said modulation means with said carrier signal from said reference oscillator.

7. A spread spectrum communications system according to claim 1, wherein each of said first and second pseudonoise signals is a pseudonoise signal of a maximal linear pseudonoise code sequence, and wherein the locally generated carrier signal is switched off when the present value of said first pseudonoise signal is equal to one, and wherein said carrier signal is switched on when the present value of said first pseudonoise signal is equal to zero.

8. A spread spectrum communications system comprising:

a transmitter having an input information modulation means for generating a spread spectrum signal in accordance with an input information signal and for generating a pseudonoise clock signal which is used to generate a first pseudonoise signal formed of a plurality of chips, the value of said first pseudonoise signal being either zero or one at each chip, a switch for switching on and off a locally generated carrier signal of said input information signal in accordance with the value of the present chip of said first pseudonoise signal, first means for inverting a phase of said spread spectrum signal outputted from said modulation means when the present value of said first pseudonoise signal changes from zero to one, second means for multiplying the inverted-phase spread spectrum signal by said locally generated carrier signal outputted from said switch to produce a transmit signal at an output of said second means, an output means for transmitting said transmit signal from said transmitter, and a receiver which receives said transmit signal from said transmitter, said receiver having a detector for obtaining a baseband signal from said transmit signal received at said detector, and demodulation means for demodulating said baseband signal with a second pseudonoise signal which is generated synchronously with said transmit signal, so as to reproduce said input information signal.

9. A spread spectrum communications system according to claim 8, wherein said receiver further comprises a band pass filter, an amplifier, a reference oscillator, a multiplier, and a variable amplifier, for processing the transmit signal received from said transmitter so as to produce a modulated spread spectrum signal with a prescribed amplitude before said transmit signal is received at said detector.

10. A spread spectrum communications system according to claim 8, wherein said transmitter includes a reference oscillator for outputting a carrier signal of the input information signal, a divider for dividing a frequency of said carrier signal and for outputting a control signal having the divided frequency, and a pseudonoise generator for generating a pseudonoise signal in accordance with said control signal so as to synchronize said pseudonoise clock signal from said modulation means with said carrier signal from said reference oscillator.

11. A spread spectrum communications system according to claim 8, wherein each of said first and second pseudonoise signals is a pseudonoise signal of a maximal linear pseudonoise code sequence, and wherein the locally generated carrier signal is switched off when the present value of said first pseudonoise signal is equal to one, and wherein said carrier signal is switched on when the present value of said first pseudonoise signal is equal to zero.

12. A spread spectrum communications system according to claim 8, wherein said input information modulation means comprises: a pseudonoise clock signal generator for generating a pseudonoise clock signal; a first pseudonoise signal generator for generating a first pseudonoise signal formed of a plurality of chips, and means for forming a spread spectrum signal by receiving an input signal consisting of a logical product of said input information signal and said first pseudonoise signal and multiplying said input signal by a locally generated carrier signal of said input information signal, and wherein said demodulation means comprises: a second pseudonoise signal generator for generating a second pseudonoise signal formed of a plurality of chips; a correlator for correlating said second pseudonoise signal with said transmit signal received at said detector and for outputting a result of the correlation; synchronizing means for synchronizing said second pseudonoise signal with said transmit signal in accordance with said result of said correlation to produce a synchronized second pseudonoise signal; and means for outputting a demodulated spread spectrum signal by multiplying said synchronized second pseudonoise signal by said transmit signal received at said detector to produce a multiplied signal, and by shaping a waveform of said multiplied signal through a waveform shaper so as to reproduce said input information signal.

13. A spread spectrum communications system according to claim 8, wherein said input information modulation means comprises: an oscillator for generating a clock signal whose frequency is modulated in accordance with said input information signal; and a first pseudonoise signal generator for generating a first pseudonoise signal formed of a plurality of chips in accordance with said clock signal, and wherein said demodulation means comprises: a second pseudonoise signal generator for generating a second pseudonoise signal being formed of a plurality of chips, a correlator for correlating said second pseudonoise signal with said transmit signal received at said detector to produce a result of correlation; synchronizing means for synchronizing said second pseudonoise signal with said transmit signal in accordance with said result of said correlation to produce a synchronized second pseudonoise signal; and means for outputting a demodulated signal by correlating said synchronized second pseudonoise signal with said transmit signal received at said detector to produce a correlated signal, and by shaping a waveform of said correlated signal through a waveform shaper so as to reproduce said input information signal.

14. A spread spectrum communications system according to claim 8, wherein said input information modulation means comprises: a pseudonoise clock signal generator for generating a pseudonoise clock signal, a first pseudonoise signal generator for generating a first pseudonoise signal formed of a plurality of chips in accordance with said pseudonoise clock signal; and a delay circuit for delaying said first pseudonoise signal generated by said first pseudonoise signal generator in accordance with said input information signal, and wherein said demodulation means comprises a second pseudonoise signal generator for generating a second pseudonoise signal formed of a plurality of chips, a correlator for correlating said second pseudonoise signal with said transmit signal received at said detector to produce a result of correlation; synchronizing means for synchronizing said second pseudonoise signal with said transmit signal in accordance with said result of said correlation to produce a synchronized second pseudonoise signal; and means for outputting a demodulated signal by correlating said synchronized second pseudonoise signal with said transmit signal received at said detector to produce a correlated signal, and by passing said correlated signal through a comparator with a hysteresis characteristic so as to reproduce said input information signal.

* * * * *